United States Patent
Anac et al.

(10) Patent No.: US 9,863,769 B2
(45) Date of Patent: Jan. 9, 2018

(54) MEMS SENSOR WITH DECOUPLED DRIVE SYSTEM

(71) Applicant: InvenSense, Inc., San Jose, CA (US)

(72) Inventors: Ozan Anac, Oakland, CA (US); Joseph Seeger, Menlo Park, CA (US)

(73) Assignee: INVENSENSE, INC., San Jose, CA (US)

( * ) Notice: Subject to any disclaimer, the term of this patent is extended or adjusted under 35 U.S.C. 154(b) by 128 days.

(21) Appl. No.: 14/678,774

(22) Filed: Apr. 3, 2015

(65) Prior Publication Data

US 2015/0211853 A1  Jul. 30, 2015

Related U.S. Application Data

(63) Continuation-in-part of application No. 14/041,810, filed on Sep. 30, 2013, and a continuation-in-part of
(Continued)

(51) Int. Cl.
*G01C 19/5712* (2012.01)
*G01C 19/56* (2012.01)
(Continued)

(52) U.S. Cl.
CPC ................ *G01C 19/5712* (2013.01)

(58) Field of Classification Search
CPC .................................. G01C 19/5712
(Continued)

(56) References Cited

U.S. PATENT DOCUMENTS

| 4,510,802 A | 4/1985 | Peters |
| 5,349,855 A | 9/1994 | Bernstein et al. |

(Continued)

FOREIGN PATENT DOCUMENTS

| CN | 1782713 A | 6/2006 |
| CN | 101663586 A | 3/2010 |

(Continued)

OTHER PUBLICATIONS

Extended European Search Report for European Application No. 15167772.1, 14 pages.
(Continued)

*Primary Examiner* — Lisa Caputo
*Assistant Examiner* — Jamel Williams
(74) *Attorney, Agent, or Firm* — Amin, Turocy & Watson, LLP

(57) ABSTRACT

In a first aspect, the angular rate sensor comprises a substrate and a rotating structure anchored to the substrate. The angular rate sensor also includes a drive mass anchored to the substrate and an element coupling the drive mass and the rotating structure. The angular rate sensor further includes an actuator for driving the drive mass into oscillation along a first axis in plane to the substrate and for driving the rotating structure into rotational oscillation around a second axis normal to the substrate; a first transducer to sense the motion of the rotating structure in response to a Coriolis force in a sense mode; and a second transducer to sense the motion of the sensor during a drive mode. In a second aspect the angular rate sensor comprises a substrate and two shear masses which are parallel to the substrate and anchored to the substrate via flexible elements.

25 Claims, 12 Drawing Sheets

Related U.S. Application Data application No. 14/472,143, filed on Aug. 28, 2014, which is a continuation of application No. 13/235,296, filed on Sep. 16, 2011, now Pat. No. 8,833,162.

(60) Provisional application No. 62/001,474, filed on May 21, 2014.

(51) Int. Cl.
*G01C 19/5747* (2012.01)
*G01C 19/42* (2006.01)
*G01C 15/14* (2006.01)

(58) Field of Classification Search
USPC .................................................. 73/504.12
See application file for complete search history.

(56) References Cited

U.S. PATENT DOCUMENTS

| | | |
|---|---|---|
| 5,481,914 A | 1/1996 | Ward |
| 5,895,850 A | 4/1999 | Buestgens |
| 5,992,233 A | 11/1999 | Clark |
| 6,067,858 A | 5/2000 | Clark et al. |
| 6,230,563 B1 | 5/2001 | Clark et al. |
| 6,250,156 B1 | 6/2001 | Seshia et al. |
| 6,508,122 B1 | 1/2003 | McCall et al. |
| 6,520,017 B1 | 2/2003 | Schoefthaler et al. |
| 6,845,669 B2 | 1/2005 | Acar et al. |
| 6,892,575 B2 | 5/2005 | Nasiri et al. |
| 6,939,473 B2 | 9/2005 | Nasiri et al. |
| 7,036,372 B2 | 5/2006 | Chojnacki et al. |
| 7,250,112 B2 | 7/2007 | Nasiri et al. |
| 7,284,430 B2 | 10/2007 | Acar et al. |
| 7,437,933 B2 | 10/2008 | Durante et al. |
| 7,458,263 B2 | 12/2008 | Nasiri et al. |
| 8,042,394 B2 | 10/2011 | Coronato et al. |
| 8,042,396 B2 | 10/2011 | Coronato et al. |
| 8,069,726 B2 | 12/2011 | Seeger et al. |
| 8,141,424 B2 | 3/2012 | Seeger et al. |
| 8,322,213 B2 | 12/2012 | Trusov et al. |
| 8,539,835 B2 | 9/2013 | Seeger et al. |
| 2003/0200804 A1 | 10/2003 | Johnson |
| 2004/0211258 A1 | 10/2004 | Geen |
| 2005/0066728 A1 | 3/2005 | Chojnacki et al. |
| 2005/0072231 A1 | 4/2005 | Chojnacki et al. |
| 2005/0081631 A1 | 4/2005 | Weinberg et al. |
| 2005/0081633 A1 | 4/2005 | Nasiri et al. |
| 2005/0199061 A1 | 9/2005 | Acar et al. |
| 2006/0070441 A1 | 4/2006 | Durante et al. |
| 2006/0112764 A1 | 6/2006 | Higuchi |
| 2006/0219006 A1 | 10/2006 | Nasiri et al. |
| 2007/0214883 A1 | 9/2007 | Durante et al. |
| 2007/0240508 A1 | 10/2007 | Watson |
| 2008/0000296 A1 | 1/2008 | Johnson |
| 2008/0115579 A1 | 5/2008 | Seeger et al. |
| 2009/0019933 A1 | 1/2009 | Sung et al. |
| 2009/0064780 A1 | 3/2009 | Coronato et al. |
| 2009/0114016 A1 | 5/2009 | Nasiri et al. |
| 2009/0193892 A1 | 8/2009 | Seeger |
| 2009/0260437 A1 | 10/2009 | Blomqvist |
| 2010/0071467 A1 | 3/2010 | Nasiri et al. |
| 2010/0199764 A1 | 8/2010 | Hammer |
| 2010/0218605 A1 | 9/2010 | Blomqvist et al. |
| 2010/0222998 A1 | 9/2010 | Blomqvist |
| 2011/0061460 A1* | 3/2011 | Seeger ............... G01C 19/5719 73/504.12 |
| 2012/0272711 A1 | 11/2012 | Supino et al. |
| 2013/0068018 A1 | 3/2013 | Seeger et al. |
| 2013/0086985 A1 | 4/2013 | Lin |
| 2013/0192365 A1* | 8/2013 | Zhuang ............... G01C 19/5733 73/504.12 |
| 2013/0233048 A1* | 9/2013 | Anac .................... G01C 25/005 73/1.77 |
| 2013/0239686 A1 | 9/2013 | Cazzaniga et al. |

FOREIGN PATENT DOCUMENTS

| | | |
|---|---|---|
| CN | 103245340 A | 8/2013 |
| CN | 103797331 A | 5/2014 |
| EP | 1568968 | 8/2005 |
| EP | 1568968 A2 | 8/2005 |
| EP | 2570770 | 3/2013 |
| EP | 2570770 A2 | 3/2013 |
| WO | WO 2009/130554 | 10/2009 |

OTHER PUBLICATIONS

International Search Report and Written Opinion for International Application No. PCT/US2012/054411, dated Dec. 24, 2012.
Office Action for U.S. Appl. No. 13/235,296, dated Dec. 26, 2013, 38 pages.
Notice of Allowance for U.S. Appl. No. 13/235,296, dated May 9, 2014, 21 pages.
Office Action for U.S. Appl. No. 13/862,352, dated May 10, 2016, 25 pages.
Notice of Allowance for U.S. Appl. No. 14/041,810, dated Apr. 20, 2015, 37 pages.
Notice of Allowance for U.S. Appl. No. 14/041,810, dated Jun. 24, 2015, 27 pages.
Office Action for U.S. Appl. No. 14/472,143, dated Apr. 20, 2015, 41 pages.
Notice of Allowance for U.S. Appl. No. 14/472,143, dated Nov. 12, 2015, 27 pages.
Notice of Allowance for U.S. Appl. No. 14/472,143, dated Dec. 18, 2015, 19 pages.
European Office Action for European Patent Application No. EP12832613 dated Dec. 10, 2015, 2 pages.
European Search Report for European Patent Application No. EP12832613 dated Feb. 2, 2015, 6 pages.
Partial European Search Report for European Patent Application No. 15167772 dated Oct. 26, 2015, 7 pages.
Extended European Search Report for European Patent Application No. 15167772 dated Feb. 11, 2016, 15 pages.
Notice of Allowance for U.S. Appl. No. 14/472,143, dated Mar. 28, 2016, 29 pages.
Korean Office Action for Korean Application No. 10-2015-0070468 dated Mar. 16, 2017, 5 pages (including English translation).
Chinese Office Action for Chinese Patent Application No. 201510258053.8 dated Aug. 1, 2017, 22 pages (including English translation).

* cited by examiner

MEMS SENSOR WITH DECOUPLED DRIVE SYSTEM

CROSS-REFERENCE TO RELATED APPLICATION

This application claims benefit under 35 USC 119(e) of U.S. Provisional Patent Application No. 62/001,474, filed on May 21, 2014, entitled "MEMS SENSOR WITH DECOUPLED DRIVE SYSTEM", is a continuation-in-part of U.S. patent application Ser. No. 14/041,810, filed Sep. 30, 2013, (IVS-212/5290P) entitled "MICROMACHINED GYROSCOPE INCLUDING A GUIDED MASS SYSTEM," and is a continuation-in-part of U.S. patent application Ser. No. 14/472,143, filed Aug. 28, 2014, (IVS-147C/5007C) entitled "MICROMACHINED GYROSCOPE INCLUDING A GUIDED MASS SYSTEM," which is a continuation application and claims priority to U.S. application Ser. No. 13/235,296, filed Sep. 16, 2011, (IVS-147/5007P) entitled "MICROMACHINED GYROSCOPE INCLUDING A GUIDED MASS SYSTEM," all of which are incorporated herein by reference in their entireties.

FIELD OF THE INVENTION

The present invention relates generally to angular velocity sensors and more particularly relates to angular velocity sensors that include guided mass systems.

BACKGROUND

Sensing of angular velocity is frequently performed using vibratory rate gyroscopes. Vibratory rate gyroscopes broadly function by driving the sensor into a first motion and measuring a second motion of the sensor that is responsive to both the first motion and the angular velocity to be sensed.

Accordingly, what is desired is to provide a system and method that overcomes the above issues. The present invention addresses such a need.

SUMMARY

An angular rate sensor is disclosed. In a first aspect, the angular rate sensor comprises a substrate and a rotating structure anchored to the substrate. The angular rate sensor also includes a drive mass anchored to the substrate and an element coupling the drive mass and the rotating structure. The angular rate sensor further includes an actuator for driving the drive mass into oscillation along a first axis in plane to the substrate and for driving the rotating structure into rotational oscillation around a second axis normal to the substrate; a first transducer to sense the motion of the rotating structure in response to a Coriolis force in a sense mode; and a second transducer to sense the motion of the sensor during a drive mode.

In a second aspect, the angular rate sensor comprises a substrate and a first shear mass and a second shear mass which are parallel to the substrate and anchored to the substrate via at least a first plurality of flexible elements. The angular rate sensor further includes a drive mass which is parallel to the substrate and anchored to the substrate via at least a second plurality of flexible elements.

DETAILED DESCRIPTION

The present invention relates generally to angular velocity sensors and more particularly relates to angular velocity sensors that include guided mass systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
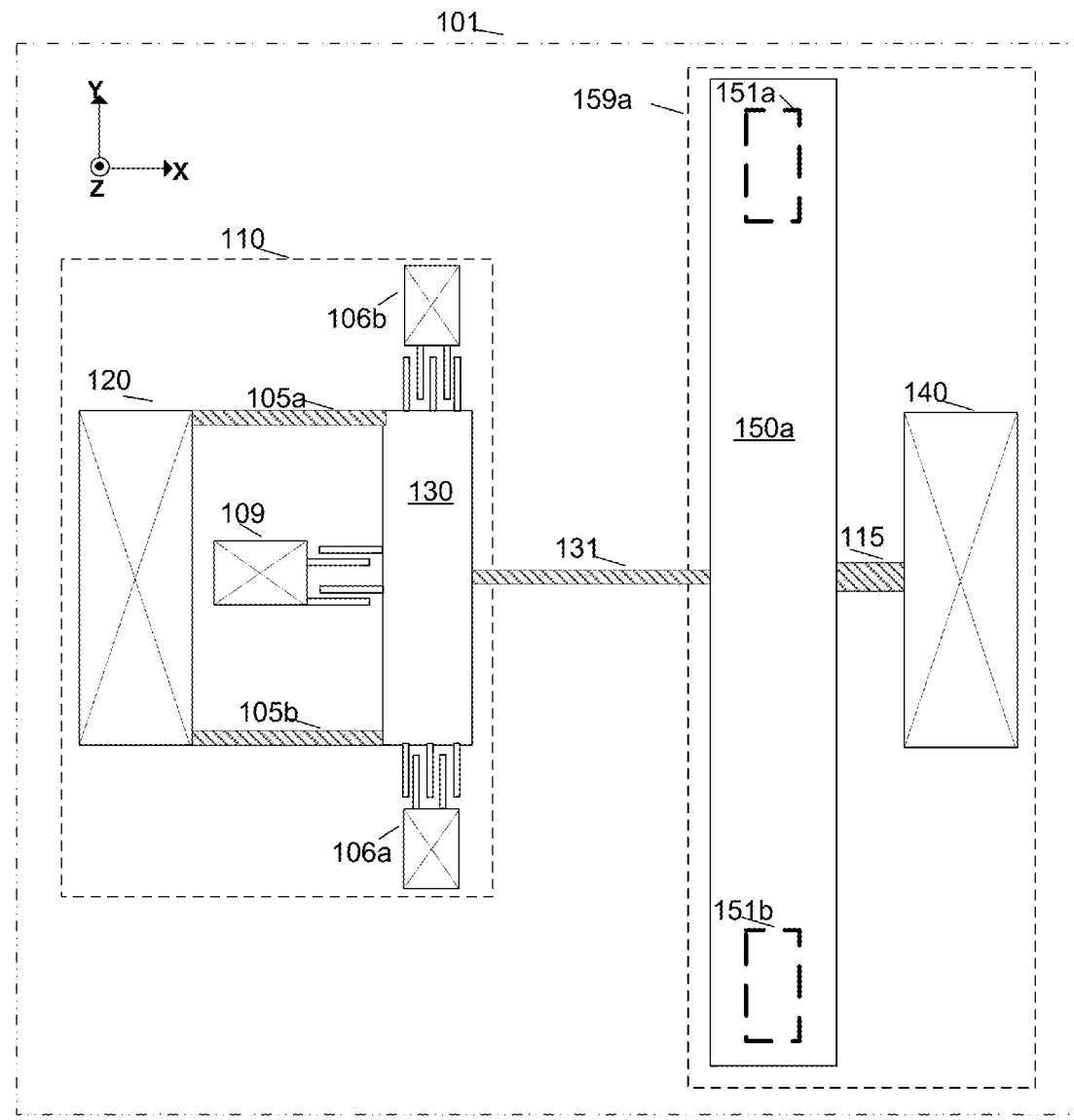
FIG. 1A illustrates a first embodiment of a single axis gyroscope in accordance with the present invention.

FIG. 1A illustrates a first embodiment of a single axis gyroscope 100a in accordance with the present invention. The single axis gyroscope is disposed in an X-Y plane parallel to a substrate 101 and comprises a drive system 110, a sense system 159a and a coupling element 131. The drive system 110 includes a drive mass 130, an electrostatic actuator 109, two drive springs 105a-b, an anchor 120 and two drive-sense electrodes 106a-b. The drive springs 105a-b and the anchor 120 act as a suspension system for the drive mass. The sense system 159a comprises a rotating proof mass 150a, a pivot spring 115, an anchor 140 and two capacitive sense electrodes 151a and 151b. Finally, the drive system 110 and the sense system 159a are coupled by a coupling spring 131. In an embodiment, the suspension system is stiffer than the coupling spring 131 while the drive mass 130 is rotating out of plane.

The drive mass 130 is coupled to the substrate through spring elements 105a-b and the anchor 120. In the drive operation of the single axis gyroscope 100a, electrostatic forces are applied to the drive mass 130 via the electrostatic actuator 109, and the motion of drive mass 130 in Y direction is detected by electrostatic transducers 106a and 106b that are called drive-sense electrodes. The detected drive motion can be transferred to circuitry to be used to control the mechanical amplitude of drive mass 130 in a closed loop operation.

Although electrostatic actuators and transducers will be described throughout this specification, one of ordinary skill in the art recognizes that a variety of actuators could be utilized for this function and that use would be within the spirit and scope of the present invention. For example, the actuators or transducers could be piezoelectric, thermal or electromagnetic or the like.

The drive mass 130 is driven in the Y direction by the electrostatic actuator 109 at a certain frequency, which is referred to as a drive frequency. While drive mass 130 is driven in the Y direction, a moment around the Z-axis and a Y-direction force are applied to the rotating proof mass 150a through the coupling spring 131. If the pivot spring 115 is very stiff in the Y direction, the rotating proof mass 150a rotates around an axis that is parallel to the Z-axis due to the applied moment. The described motion of the drive mass 130 and rotating proof mass 150a is referred to as a drive motion.

When the gyroscope 100a is subject to an angular velocity about a roll-input axis in the Y-direction that is in the plane of the substrate 101 and orthogonal to the X-direction will cause Coriolis forces to act on the rotating proof mass 150a in the Z-direction. The Coriolis forces cause the rotating proof mass 150a to rotate out-of-plane about the roll-sense axis which is parallel to the X-direction. The amplitude of the rotation of the rotating proof mass 150a is proportional to the angular velocity about the roll-input axis and also mechanical drive amplitude of the rotating proof mass 150a. The capacitive sense electrodes 151a and 151b, which are placed on the substrate 101 under the rotating proof mass 150a, are used to detect the rotation of the rotating proof mass 150a about the roll-sense axis. This rotation provides a measure of the angular velocity about the roll-input axis. Although the capacitive electrodes 151a and 151b are given as transducers to detect the rotation of the rotating proof mass 150a around the roll-sense axis, various types of transducers could be utilized in the present invention. For example, the capacitive electrodes 151a-b could be also piezoelectric or optical or the like and its use would be within the spirit and scope of the present invention.

Figure 1B:
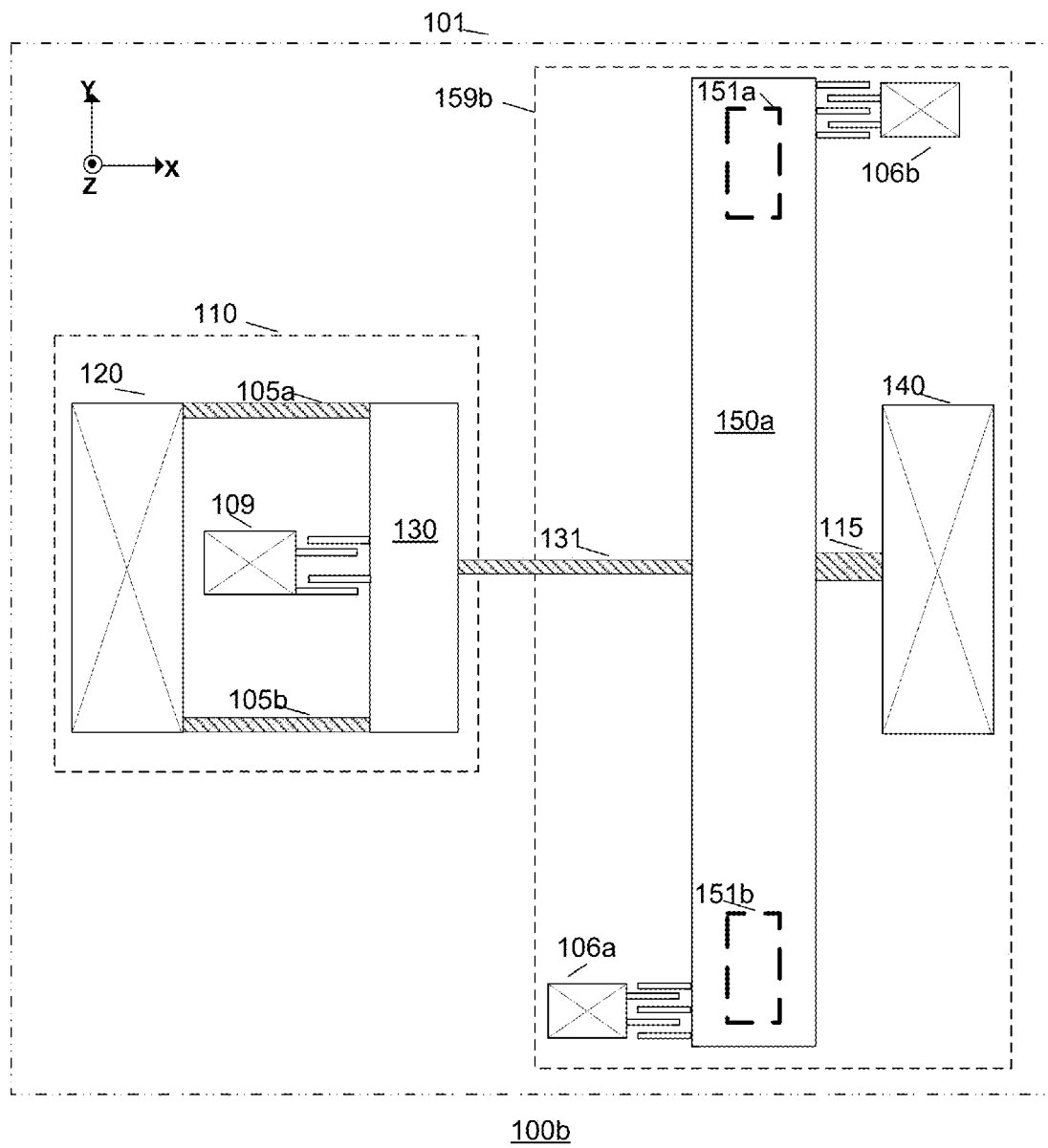
FIG. 1B illustrates a second embodiment of a single axis gyroscope in accordance with the present invention.

As it is given in FIGS. 1A and 1B, the drive mass 130 is separated from the rotating proof mass 150a and the electrostatic actuators 109 are attached to the drive mass 130. A benefit of this approach is to eliminate the effect of the non-idealities of the electrostatic actuator 109 on the rotating proof mass 150a. The non-idealities of the electrostatic actuator may be due to the fabrication imperfections, like sidewall angle during deep reactive ion etching, or built-in stresses due to the environmental effects.

As an example, the electrostatic forces generated by a non-ideal electrostatic actuator may not be only in-plane but also out-of plane, the out-of plane non-ideal forces could result in unwanted out-of plane motion and rotation of the rotating proof mass 150a around its sensitive axis. The unwanted rotation of the rotating proof mass 150a around its sensitive axis would lead to erroneous motion which can be detected by the capacitive sense electrodes 151a-b resulting in an error in the measurement of angular velocity.

On the other hand, in FIGS. 1A and 1B, drive mass 130 is coupled to the anchor 120 via springs 105a-b which are very stiff in Z direction. As a result, the motion of drive mass 130 due to the non-ideal out-of plane electrostatic forces by actuator 109 is minimized. Consequently, the non-ideal forces are not transferred to the proof mass 150a, and measurement errors are reduced.

In FIG. 1A, the coupling spring 131, which is used to transfer the linear Y direction motion of the drive mass 130 to the rotation of the proof mass 150a, can be made very stiff in Y-direction, but act as a pivot for rotation about z-axis or a torsion spring. Using a flexure as a coupling spring 131 in embodiment 100a can be an option to satisfy those compliance conditions.

If the coupling spring 131 is made very stiff in Y-direction, but act as a pivot for rotation about z-axis, the whole single axis gyroscope 100a would act as a single Degree of Freedom (DOF) mechanical system in the drive motion. The Y-direction motion of drive mass 130 is converted to in-plane rotation of the proof mass 150a around an axis parallel to the Z direction. The amount of rotation of proof mass 150 depends on the ratio of the length of the coupling spring to the radius of rotation of the proof mass 150a with respect to the center of its rotation. The Y-direction motion is either amplified or attenuated depending on the ratio. Moreover, the drive-sense electrodes 106a-b can be placed on the drive mass 130 without effecting the closed loop drive operation.

FIG. 1B illustrates a second embodiment of a single axis gyroscope in accordance with the present invention. In the embodiment shown in FIG. 1B, the coupling spring 131 is compliant in the Y-direction and can be designed so that single axis gyroscope 100b acts as a two DOF system in the drive motion. In that configuration, the sense system 159b can be designed as a vibration absorber of the drive mass 130. As a result, small motion on drive mass 130 can be amplified to get bigger motion on the sense mass 150a. For a vibration absorber configuration, it is necessary that drive-sense electrodes 106a-b to be connected to the rotating proof-mass 150a as it is shown in FIG. 1B. The connection is necessary to allow the rotational motion of rotating proof mass 150a at a certain mechanical amplitude around the Z axis (the main component of the drive motion) to maximize the sensitivity of the gyroscope 100b.

The small motion on the drive mass 130 is beneficial for area optimization. If the drive mass 130 has small drive motion, the electrostatic actuator gaps could be kept small, which will result in area savings. Moreover, the small drive motion is beneficial to minimize the spring softening, squeeze film damping and the non-linearity effects.

Figure 1C:
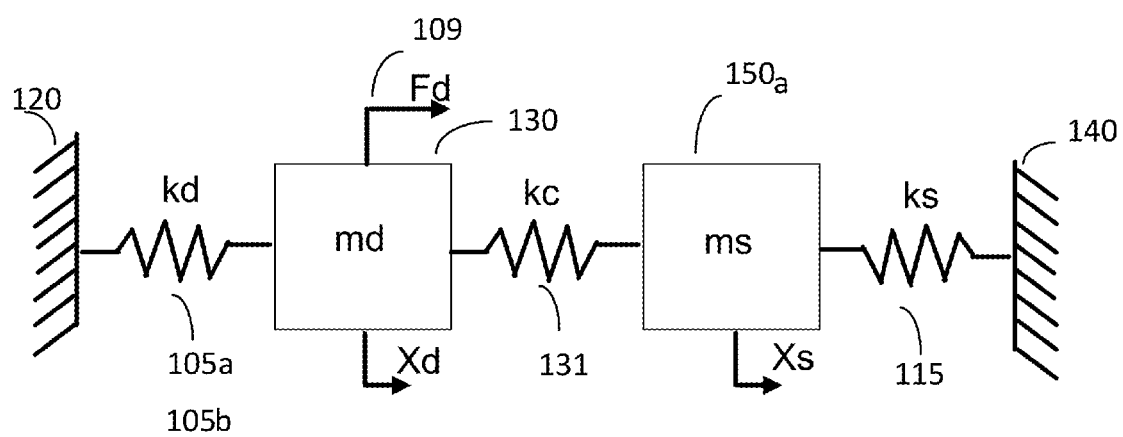
FIG. 1C is a simple block diagram of the gyroscope of FIG. 1B.
Figure 1D:
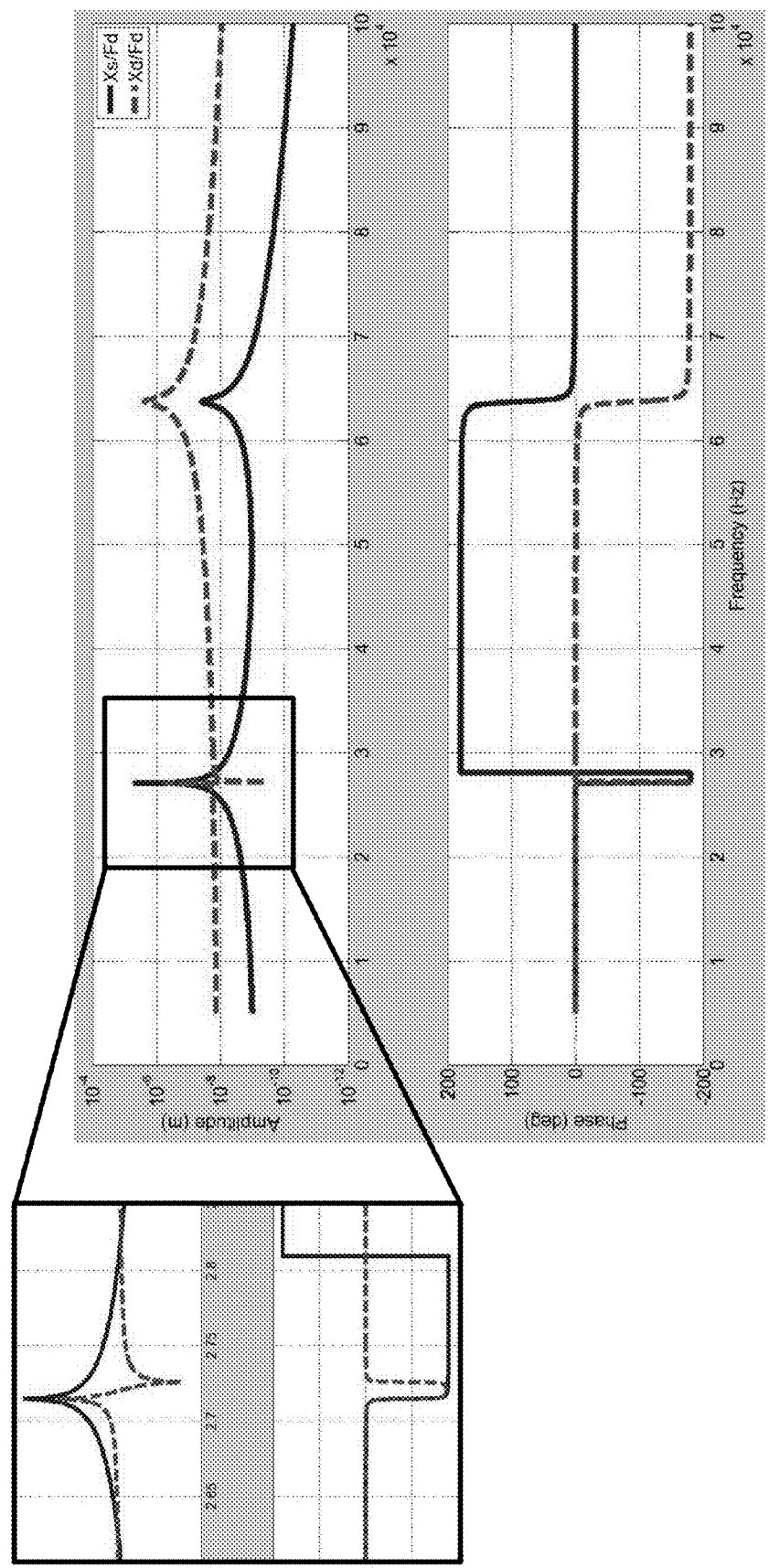
FIG. 1D illustrates bode plots of the transfer functions Xdf/Fd and Xs/Fd of the gyroscope of FIG. 1B.

To explain the operation of the gyroscope 100b in more detail refer now to FIGS. 1C and 1D. FIG. 1C is a simple block diagram of the gyroscope 100b, the reference numerals which conform to those of FIG. 1B. It is desirable in the gyroscope 100b that the drive mass 130 moves less than the sense mass 150a. The minimization of motion of 130 is accomplished by tuning the coupling spring kc (131) such that it is at least an order of magnitude more flexible than the springs kd (105a/105b) and ks (115).

To explain the tuning of kc spring in more detail, bode plots of the transfer functions Xd/Fd and Xs/Fd are shown in FIG. 1D where Xd is the movement of the drive mass 130 in a first direction, Xs is the movement the sense mass 150a in a second direction and Fd is the force caused by the actuator 109 on the drive mass 130. In FIG. 1D, the top plot shows the amplitude vs. frequency information and the bottom plot shows phase vs. frequency.

Xd/Fd transfer function has two peaks, and one zero. A first peak represents a motion of the drive mass (md) in the common mode shape, and the second peak represents a motion of the drive mass (md) in differential mode shape. In an embodiment, the flexibility of the coupling spring kc is such that the transfer function Xs/Fd is greater than Xd/Fd at a specific frequency range of interest. As an example in FIG. 1D, an expansion of a specific region has been shown. Based on the 2-DOF mechanical system dynamics, if the kc spring is sufficiently compliant compared to the ks and kd, the separation between first peak and zero is minimized in Xd/Fd transfer function. So, the amplitude of the first peak is attenuated. On the other hand Xs/Fd transfer function is not affected by the zero due to the 2-DOF system characteristics and its amplitude remains constant in the frequency range of interest. As a result, by placing the zero close to the first peak in Xd/Fd, the amplitude difference between drive mass and sense mass is obtained.

Figure 2:
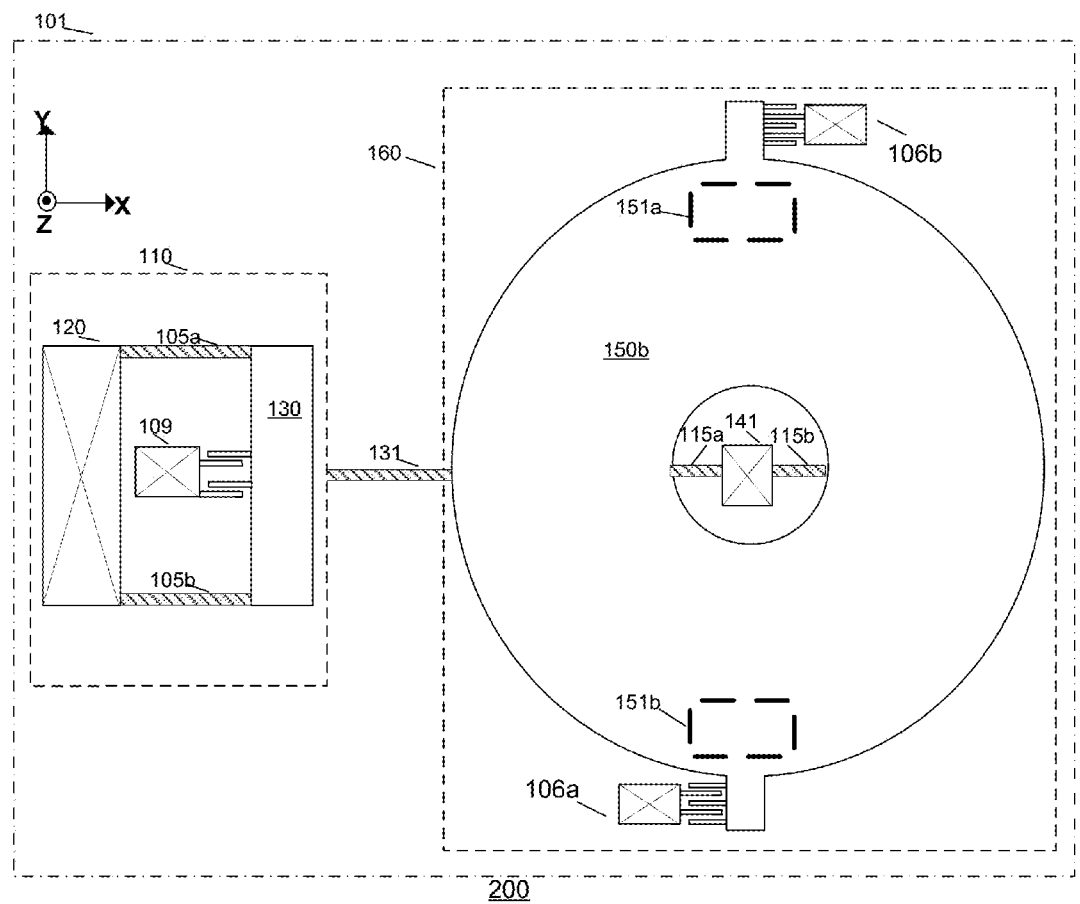
FIG. 2 illustrates a third embodiment of a single axis gyroscope in accordance with the present invention.

FIG. 2 illustrates a third embodiment of a single axis gyroscope 200 in accordance with the present invention. In this embodiment, the sense system 160 has some differences compared to the sense system 159a which is shown in FIG. 1A. The sense system 160 comprises a circular proof mass 150b, instead of a rectangular proof mass 150a given in FIG. 1A. Moreover, the proof mass 150b is coupled to the substrate via two pivot springs 115a and 115b and the anchor 141. The drive system 110 is similar to the embodiment given in FIG. 1A. Similar to the single axis gyroscopes shown in FIGS. 1A and 1B, the single axis gyroscope 200 is driven via electrostatic actuator 109 attached to the drive mass 130.

When the drive mass 130 is driven in Y direction, the proof mass 150b rotates around Z axis. The amplitude of the drive motion of the proof mass 150b depends on the drive mass 130 motion and the coupling spring 131 stiffness as it was explained previously. The amplitude of drive motion of the proof mass 150b is detected by the drive sense electrodes 106a and 106b An angular velocity about a roll-input axis in the Y-direction that is in the plane of the substrate 101 and orthogonal to the X-direction will cause Coriolis forces to act on the proof mass 150b in the Z-direction. The Coriolis forces cause the proof mass 150b to rotate out-of-plane about the roll-sense axis which is parallel to the X-direction. The amplitude of the rotation of the proof mass 150b is proportional to the angular velocity about the roll-input axis. The capacitive sense electrodes 151a and 151b, which are placed on the substrate 101 under the proof mass 150b, are used to detect the rotation of the proof mass 150b about the roll-sense axis. This rotation provides a measure of the angular velocity about the roll-input axis.

Figure 3:
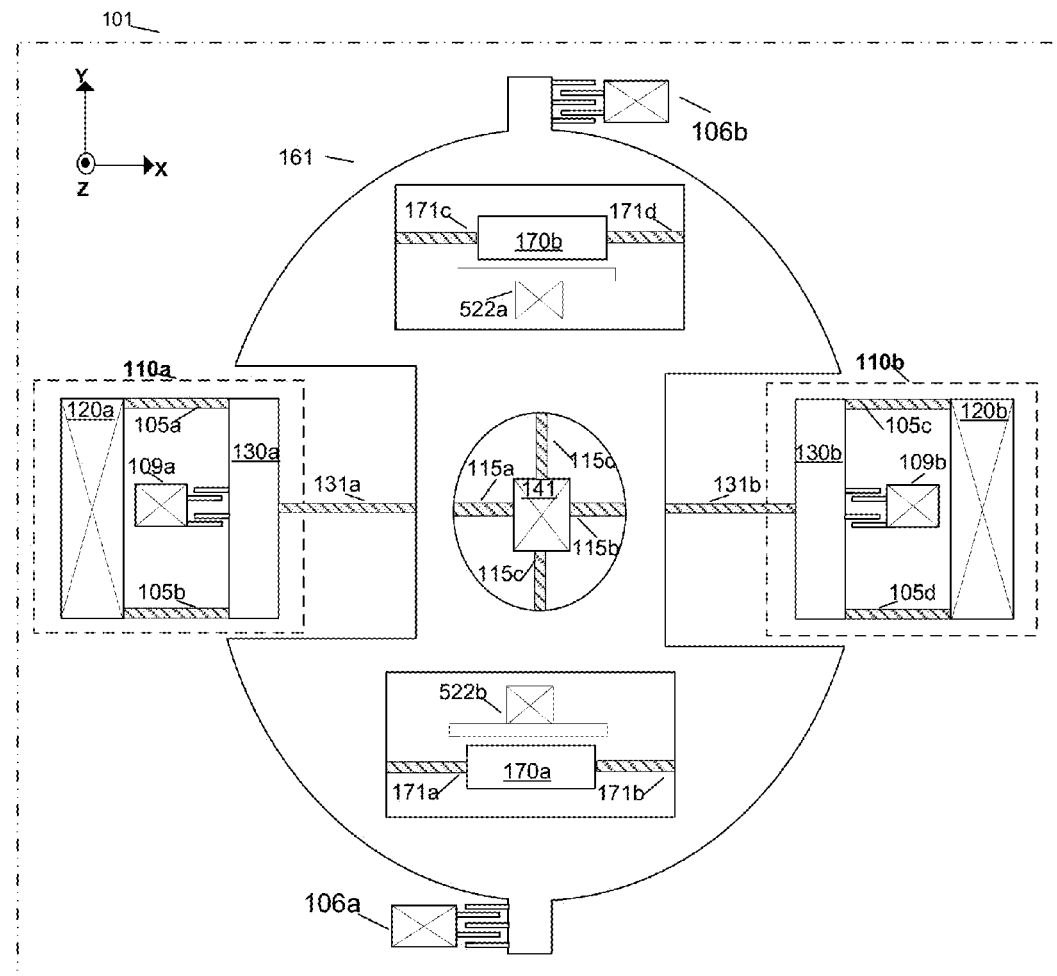
FIG. 3 illustrates a fourth embodiment of a single-axis gyroscope configuration in accordance with the present invention.

FIG. 3 illustrates a fourth embodiment of a single-axis gyroscope 300 configuration in accordance with the present invention. The gyroscope configuration 300 includes two drive systems 110a and 110b, two coupling springs 131a and 131b, a rotating structure 161 and two yaw proof mass systems 180a and 180b. Drive systems 110a and 110b are similar to the drive system 110 given in FIG. 1A, FIG. 1B and FIG. 2. Drive systems 110a-b both include anchors 120a-b, drive springs 105a-d, drive masses 130a-b, drive-sense combs 106a and 106b and electrostatic actuators 109a-b. Yaw proof mass systems 180a-b both include a yaw proof mass 170a-b, yaw sense springs 171a-d and the electrostatic transducers 522a-b.

Rotating structure 161 is coupled to the anchor 141 via springs 115a-d. Rotating structure 161 is connected to the drive systems 110a-b via coupling springs 131a-b and finally rotating structure supports the yaw proof mass systems 180a-b via springs 171a-d. In the drive motion of the single-axis gyroscope 300, electrostatic actuators 109a-b drives the proof masses 130a and 130b anti-phase in Y direction. Anti-phase motion of drive masses 130a-b result in rotation of rotating structure 161 around Z-axis which is detected by the drive-sense combs 106a and 106b. As a result of the Z axis rotation of rotating structure 161, yaw proof masses 170a-b translate anti-phase in the X direction since they are attached to rotating structure 161 through springs 171a-d. Springs 171a-d are very stiff in the X direction so that they don't deflect during the drive motion.

While the yaw proof masses are driven in X direction, an angular velocity about a yaw input axis in the Z direction that is normal to the substrate 101 will cause Coriolis forces to act on yaw proof masses 170a-b in the Y-direction. The Coriolis forces cause the proof masses 170a-b to translate anti-phase in Y direction. The amplitude of the rotation of the proof masses is proportional to the angular velocity about the yaw-input axis. The capacitive in-plane sense electrodes 522a and 522b, which are attached to the substrate 101 via anchors, are used to detect the Y direction translation of the proof masses 170a-b. This translation provides a measure of the angular velocity about the yaw-input axis.

In FIG. 3, springs 115a-d are configured such a way that the out of plane rotation and translation of rotating structure 161 is minimized. As a result, single-axis gyroscope 300 is not responsive to Coriolis forces around pitch and roll-input axes. However, for different embodiments, the spring configuration can be adjusted to detect the Coriolis response due to pitch and roll axes inputs.

The drive systems 110a and 110b are decoupled from the yaw proof masses 170a and 170b by using a similar approach given in FIG. 1A. Consequently, the benefits of decoupling the drive system from the sensing proof mass mentioned in the explanation of FIGS. 1A and 1B will apply equally to the single-axis gyroscope 300.

Figure 4:
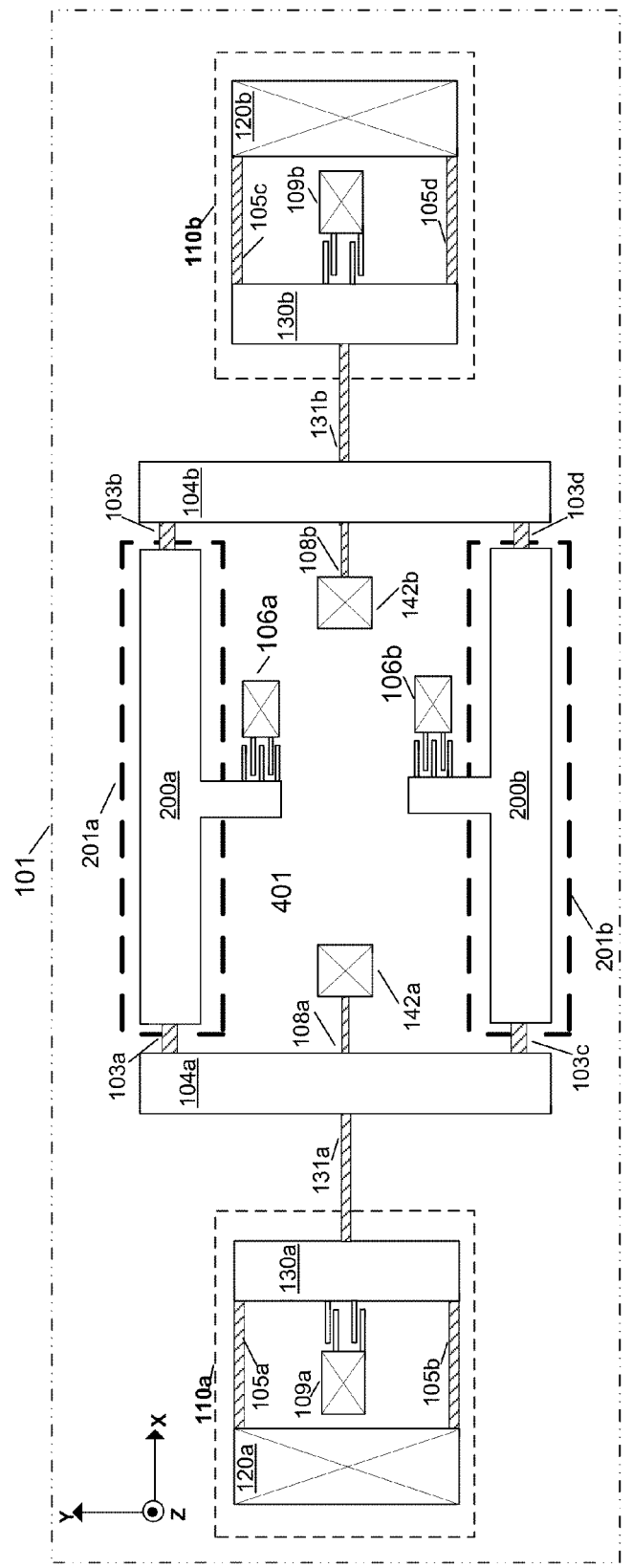
FIG. 4 illustrates a fifth embodiment of a single axis gyroscope in accordance with the present invention.

FIG. 4 illustrates a fifth embodiment of a single axis gyroscope 400 in accordance with the present invention. In the gyroscope 400, a guided mass system 401 is disposed in an X-Y plane parallel to a substrate 101. The guided mass system 401 includes guiding arms 104a and 104b that are flexibly coupled via springs 108a and 108b to the substrate 101 via the anchoring points 142a and 142b, respectively. The two guiding arms 104a and 104b are flexibly coupled to the roll proof-masses 200a-b via springs 103a-d.

The roll proof-masses 200a-b, guiding arms 104a and 104b, anchoring points 142a-b, and springs 103a-d, 108a-b form a planar four-bar linkage. Each spring 103a-d and 108a-b is compliant in-plane about an axis in the Z-direction so that each guiding arm 104a and 104b can rotate in-plane while the proof-masses 200a-b translates anti-phase in an X-direction.

The springs 108a and 108b are compliant about a first roll-sense axis in the X-direction so that the guiding arms 104a and 104b can rotate out-of-plane. The springs 103a-d are stiff in the Z-direction, whereby out-of-plane rotation of the guiding arms 104a and 104b causes the roll proof-masses 200a-b to move anti-phase out-of-plane.

Drive systems 110a and 110b are similar to the drive system 110 described with respect to FIG. 3. Drive systems 110a-b both include anchors 120a-b, drive springs 105a-d, drive masses 130a-b, drive-sense combs 106a and 106b and electrostatic actuators 109a-b and they are coupled to guiding arms 104a and 104b via coupling springs 131a and 131b.

The guided mass system 401 can be driven at a drive frequency by a single drive circuit coupled to the actuators 109a and 109b. The drive frequency can be a resonant frequency of the single-axis gyroscope 400. When the drive masses 130a-b are driven anti-phase in the Y direction with the electrostatic force applied by the actuators 109a-b, the guiding arms 104a and 104b rotate in-plane and the roll proof-masses 200a-b translates in-plane anti-phase in the X-direction which is detected by the drive-sense combs 106a and 106b.

Angular velocity about a roll-input axis in the Y-direction that is in the plane of the substrate and orthogonal to the X-direction will cause Coriolis forces to act on the roll proof-masses 200a-b in the Z-direction. The Coriolis forces cause the guided mass system 401 to rotate out-of-plane about the first roll-sense axis which is parallel to the X-direction. When the guided mass system 401 rotates out-of-plane, the guiding arms 104a and 104b and the roll proof-masses 200a-b rotate out-of-plane about the first roll-sense axis.

The amplitude of the rotation of the guided mass system 401 is proportional to the angular velocity about the roll-input axis. Transducers 201a-b under the roll proof-masses 200a-b are used to detect the rotation of the guided mass system 401 about the roll-sense axis. This rotation provides a measure of the angular velocity about the roll-input axis.

Figure 5:
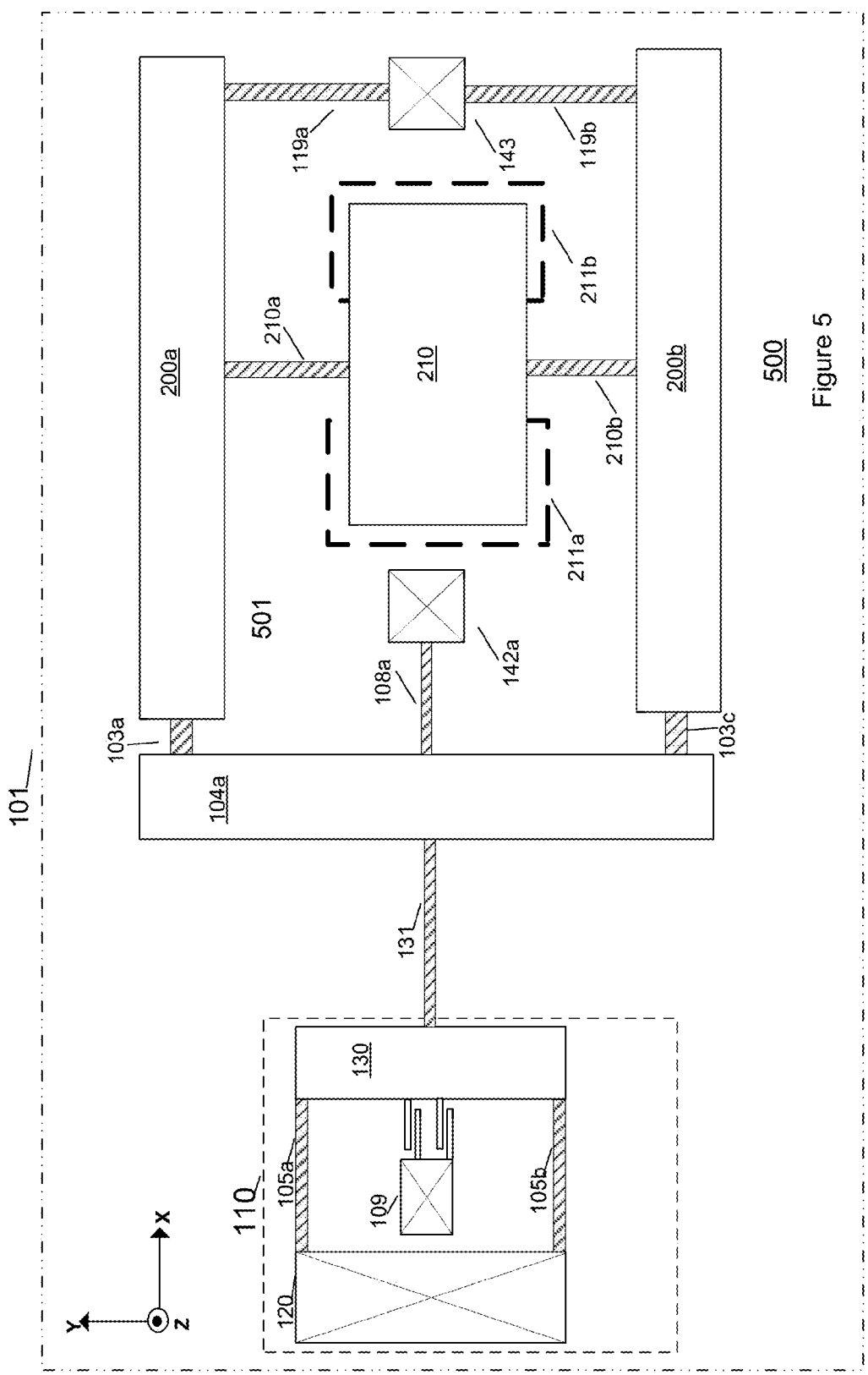
FIG. 5 illustrates a sixth embodiment of a single axis gyroscope in accordance with the present invention

FIG. 5 illustrates a sixth embodiment of a single axis gyroscope 500 in accordance with the present invention In the gyroscope 500, a guided mass system 501 comprises guided proof masses 200a-b, guiding arm 104a, and pitch proof mass 210. Single axis gyroscope further comprises drive system 110, which is similar to the drive system given in FIG. 1A. Drive system 110 is coupled to the guided mass system 501 via coupling spring 131. Guiding arm 104a is connected to substrate 101 via spring 108a through anchor 142a. Guided proof masses 200a and 200b are coupled to guiding arm 104a via springs 103a and 103c, respectively. Furthermore, guided proof masses 200a-b are coupled to the substrate via springs 119a-b through anchor 143.

The pitch proof-mass 210 is flexibly connected to two guided proof-masses 200a and 200b via springs 210a and 210b, respectively. Springs 210a and 210b are torsionally compliant such that pitch proof-mass 210 can rotate out-of-plane about a pitch sense axis in the Y-direction. During the drive motion of single axis gyroscope 500, drive mass 130 is driven in Y direction by actuator 109. The Y direction motion is transferred to the guided mass system through coupling spring 131 and results in rotation of guiding arm 104a about an axis that is parallel to the Z direction. The in-plane rotation of guided arm 104a causes anti-phase translation of guided proof masses 200a-b in the X direction. Springs 210a and 210b are compliant in-plane such that when the guided proof-masses 200a and 200b are driven anti-phase in the X-direction; the pitch proof-mass 210 rotate in-plane about an axis in the Z-direction.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. This rotation provides a measure of the angular velocity about the pitch-input axis.

Figure 6:
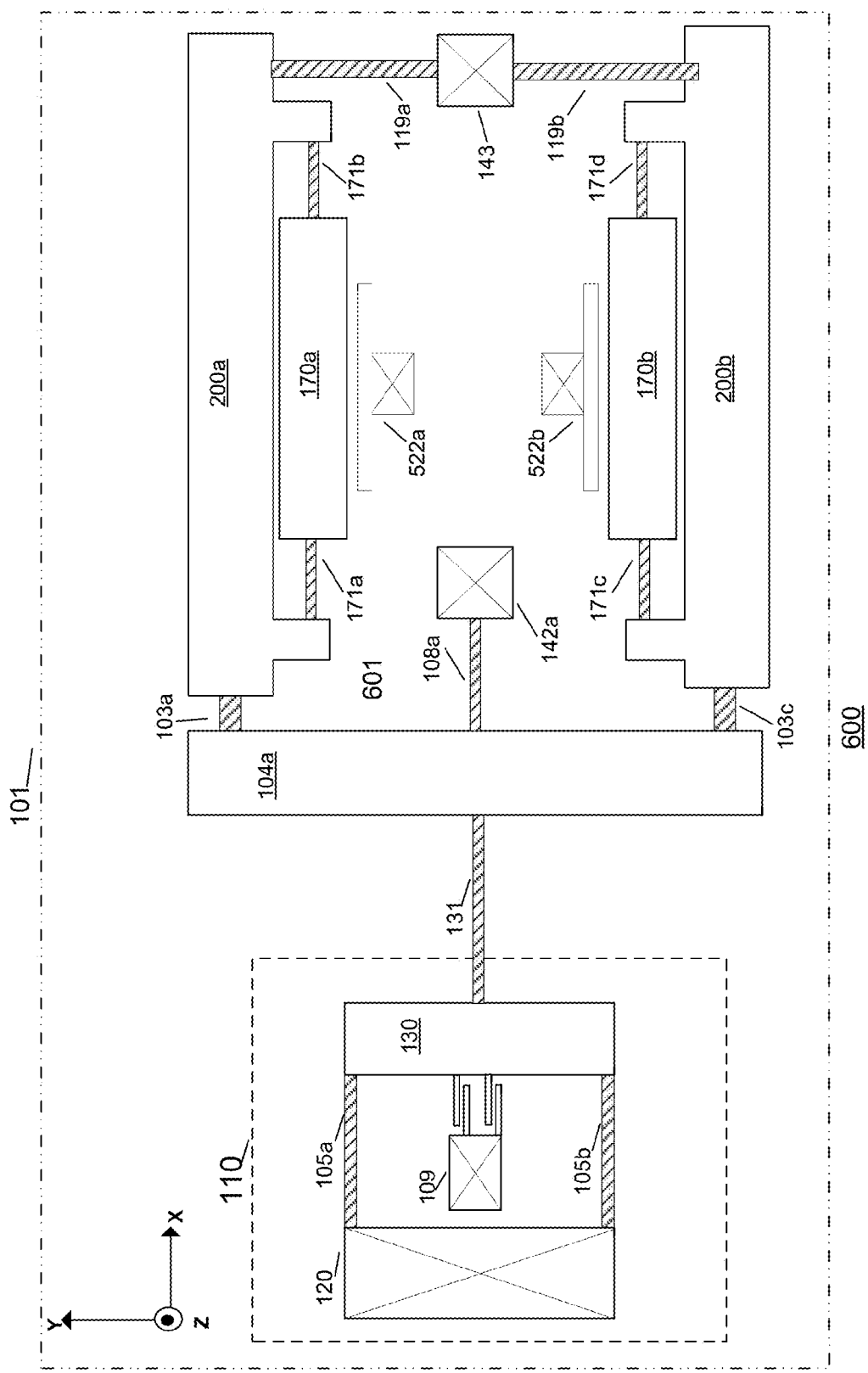
FIG. 6 illustrates a seventh embodiment of a single axis gyroscope in accordance with the present invention.

FIG. 6 illustrates a seventh embodiment of a single axis gyroscope 600 in accordance with the present invention. Single axis gyroscope 600 includes a guided mass system 601 coupled to two yaw proof masses 170a and 170b and a drive system 110.

Drive system 110 is coupled to the guided mass system 601 via coupling spring 131. Guiding arm 104a is connected to substrate 101 via spring 108a through anchor 142a. Guided proof masses 200a and 200b are coupled to guiding arm 104a via springs 103a and 103c, respectively. Furthermore, guided proof masses 200a-b are coupled to the substrate via springs 119a-b through anchor 143.

The yaw proof-masses 170a and 170b are flexibly connected to guided proof masses 200a and 200b via springs 171a-b and 171c-d respectively. Springs 171a-d are compliant in Y direction such that yaw proof-masses 170a and 170b can translate along an axis parallel to the Y direction. During the drive motion of single axis gyroscope 600, drive mass 130 is driven in Y direction by actuator 109. The Y direction motion is transferred to the guided mass system through coupling spring 131 and results in rotation of guiding arm 104a about an axis that is parallel to the Z direction. The in-plane rotation of guided arm 104a causes anti-phase translation of guided proof masses 200a-b in the X direction. Springs 171a-d are axially stiff in the X-direction such that when the guided proof-masses 200a and 200b are driven anti-phase in the X-direction, the yaw proof-masses 170a and 170b also translate anti-phase in the X-direction.

Angular velocity about the yaw-input axis will cause Coriolis forces to act on the yaw proof-masses 170a and 170b resulting in motion of the yaw proof-masses 170a-b anti-phase along the Y-direction. The amplitude of the motion of the yaw proof masses along the Y-direction is proportional to the angular velocity. Transducers 522a and 522b are used to sense the motion of the respective yaw proof masses 170a and 170b along the Y-direction.

Figure 7:
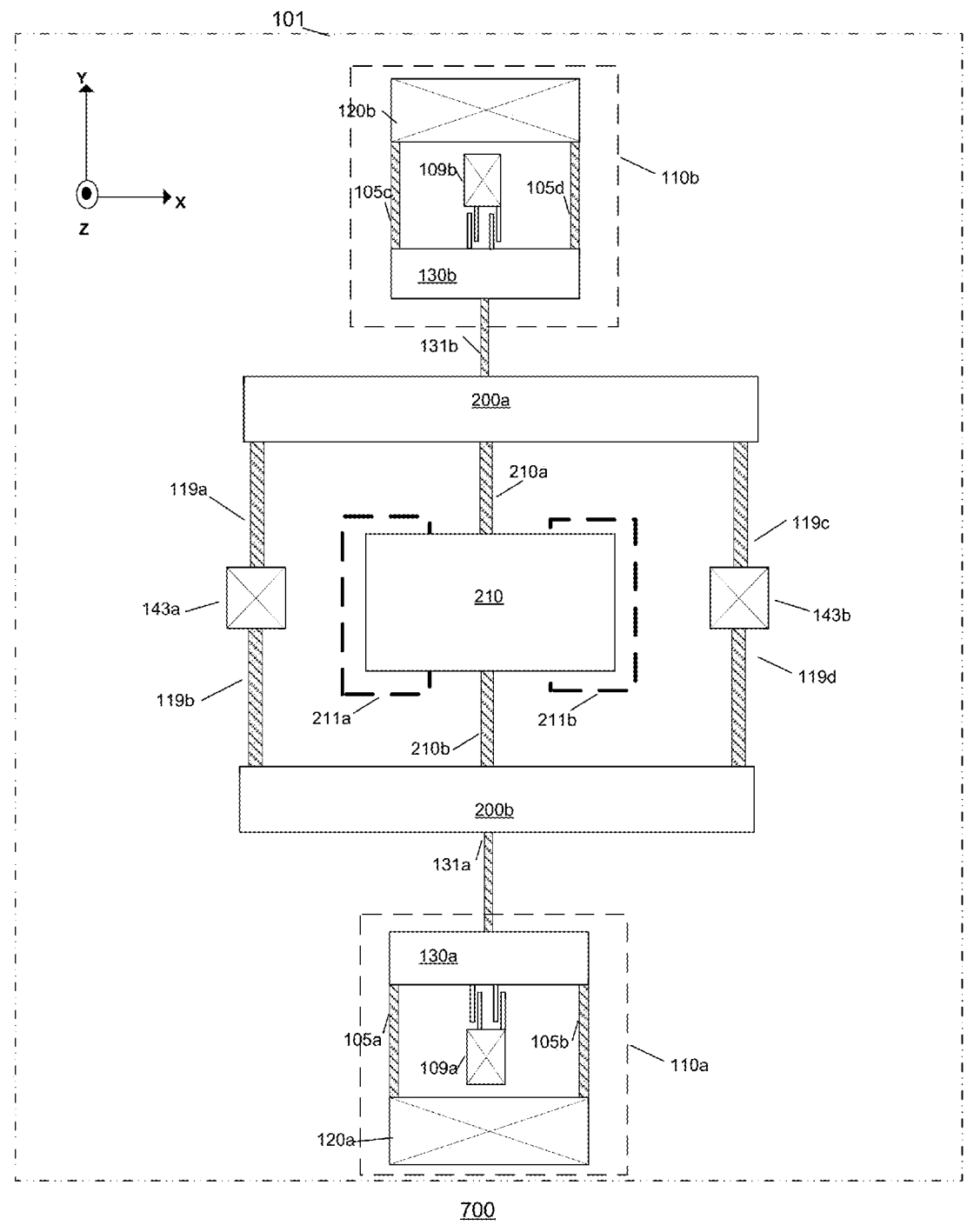
FIG. 7 illustrates a single axis shear mode gyroscope in accordance with the present invention.

FIG. 7 illustrates a single axis shear mode gyroscope 700 in accordance with the present invention. Gyroscope 700 includes shear masses 200a and 200b which are coupled to a substrate 101 via spring elements 119a-b and 119c-d through anchors 143a and 143b. Drive systems 110a-b are connected to the shear proof masses 200a and 200b via coupling springs 131a and 131b, respectively. The pitch proof-mass 210 is flexibly connected to two shear masses 200a and 200b via springs 210a and 210b. Springs 210a and 210b are torsionally compliant such that pitch proof-mass 210 can rotate out-of-plane about a pitch sense axis in the Y-direction.

Each drive system 110a and 110b of FIG. 7 includes a drive mass 130a-b which are coupled to the substrate via drive springs 105a-b and 105c-d through the anchors 120a-b. In the drive motion of single axis shear mode gyroscope 700, the drive masses 130a-b are driven anti-phase in the X direction by the actuators 109a and 109b. X direction motion of the drive masses 130a-b is transferred to the shear masses 200a-b via the coupling springs 131a-b. As a result, the shear masses 200a-b are driven anti-phase in the X-direction. Springs 210a and 210b are compliant in-plane such that when the shear masses 200a and 200b are driven anti-phase in the X-direction; the pitch proof-mass 210 rotate in-plane about an axis in the Z-direction.

Drive motion of the shear masses 200a and 200b is referred to hereinafter as shear mode drive motion. Shear mode drive motion can be generalized by defining a specific motion between the two shear masses 200a and 200b and their coupling relationship. In the shear mode drive motion, the two shear masses 200a and 200b are coupled with a spring or spring-mass system, and the shear masses 200a and 200b translate anti-phase along a direction that is perpendicular to a line that is connecting their geometric center.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. This rotation provides a measure of the angular velocity about the pitch-input axis.

Figure 8:
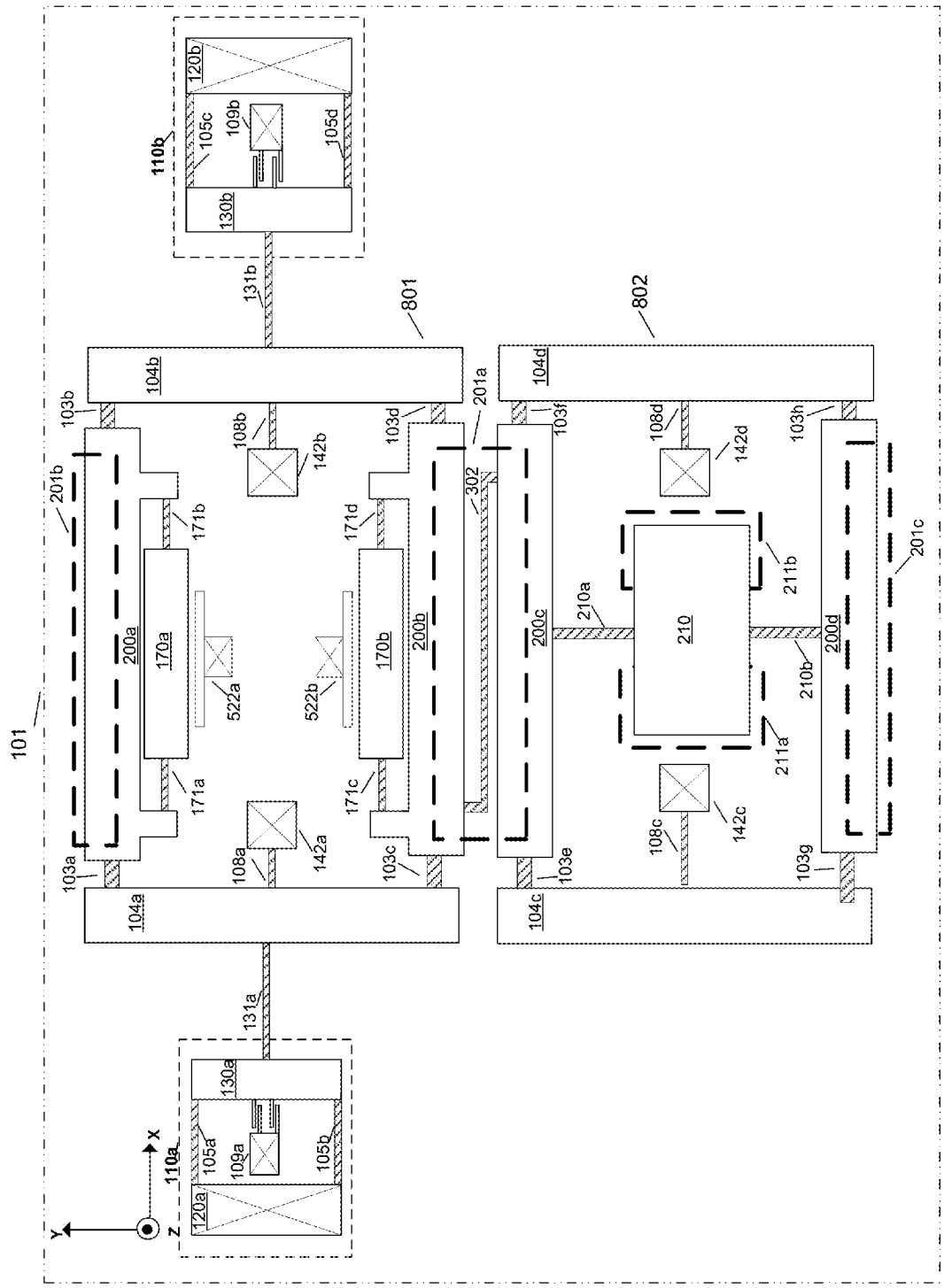
FIG. 8 illustrates a first embodiment of a tri-axis gyroscope in accordance with the present invention.

FIG. 8 illustrates a first embodiment of a tri-axis gyroscope 800 in accordance with the present invention. The gyroscope 800 includes two guided mass systems 801 and 802 coupled together by a coupling spring 302 which connects roll proof-masses 200b and 200c. Guided mass system 801 comprises guided roll proof-masses 200a-b, guiding arms 104a-b, and yaw proof-masses 170a-b. The yaw proof-masses 170a and 170b are flexibly connected to the roll proof-masses 200a and 200b via springs 171a-b and 171c-d respectively. Guided mass system 802 comprises guided roll proof-masses 200c-d, guiding arms 104c-d, and a pitch proof mass 210. The pitch proof-mass 210 is flexibly connected to two guided proof-masses 200a and 200b via springs 210a and 210b, respectively. Springs 210a and 210b are torsionally compliant such that pitch proof-mass 210 can rotate out-of-plane about a pitch sense axis in the Y-direction. Drive systems 110a and 110b are coupled to the guided mass system 801 through guiding arms 104a and 104b via coupling springs 131a and 131b. In different embodiments of tri-axis gyroscope 800, drive systems 110a-b can also be coupled to guided mass system 802.

Tri-axis gyroscope 800 is driven at a drive frequency by a single drive circuit (not shown) coupled to the actuators 109a-b. The drive masses 130a-b are vibrated anti-phase in the Y direction with the electrostatic force applied by the actuators 109a-b. Motion of the drive masses 130a-b transferred to the guiding arms 104a and 104b through the coupling springs 131a and 131b. Guiding arms 104a and 104b rotate in-plane around an axis that is parallel to the Z direction due to the applied torque which is a result of the motion of the drive masses 130a-b. As a result of the in-plane rotation of guiding arms 104a and 104b, the roll proof-masses 200a-b translates in-plane anti-phase in the X-direction. Springs 171a-d are axially stiff in the X-direction such that when the roll proof-masses 200a and 200b are driven anti-phase in the X-direction, the yaw proof-masses 170a and 170b also translate anti-phase in the X-direction.

The coupling spring 302 is stiff in the X-direction such that roll proof-masses 200b and 200c move together in the X-direction. The roll proof-masses 200a and 200d move in opposite direction of roll proof-masses 200b and 200c. Springs 210a and 210b are compliant in-plane such that when the roll proof-masses 200c-d are driven, the pitch proof-mass 210 rotate in-plane about an axis parallel to the Z-direction.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. This rotation provides a measure of the angular velocity about the pitch-input axis.

Angular velocity about the roll-input axis causes Coriolis forces to act on the roll proof-masses 200a-d in the positive and negative Z-direction. The coupling spring 302 is torsionally compliant about an axis in the X-direction so that the guided mass systems 801 and 802 can rotate anti-phase out-of-plane about the first and second roll-sense axes. The coupling spring 302 is stiff in the Z-direction which prevents the guided mass systems 801 and 802 from rotating in-phase out-of-plane. Transducers 201a-c under the roll proof masses 200a-d are used to detect the rotations of the guided mass systems 801 and 802 about the first and second roll-sense axes.

Angular velocity about the yaw-input axis will cause Coriolis forces to act on the yaw proof-masses 170a and 170b resulting in motion of the yaw proof-masses 170a and 170b anti-phase along the Y-direction. The amplitude of the motion of the yaw proof-masses along the Y-direction is proportional to the angular velocity. Transducers 522a and 522b are used to sense the motion of the respective yaw proof masses 170a and 170b along the Y-direction.

Figure 9:
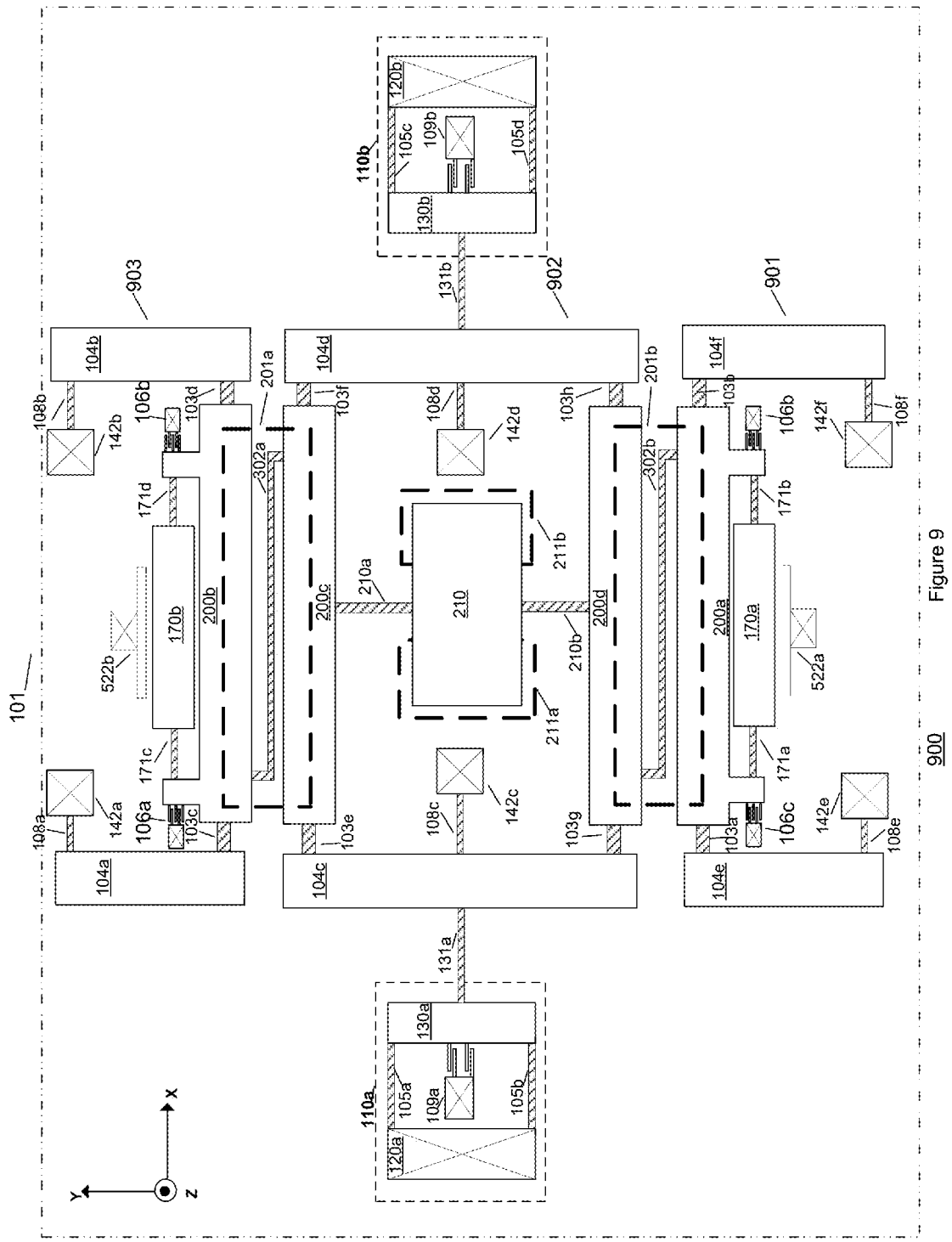
FIG. 9 illustrates a second embodiment of a tri-axis gyroscope in accordance with the present invention.

FIG. 9 illustrates a second embodiment of a tri-axis gyroscope 900 in accordance with the present invention. Tri-axis gyroscope 900 comprises three guided mass systems 901, 902, 903 and two drive mass systems 110a-b. Guided mass systems 901 and 903 are coupled to guided mass system 902 by coupling springs 302a and 302b. And drive mass systems 110a and 110b are coupled to the guided mass system 902 via coupling springs 131a and 131b.

The guided mass systems 901, 902 and 903 are arranged so that the roll proof-masses 200a-d all move in the X-direction, the pitch proof-mass 210 rotates about an axis in the Z-direction, and the yaw proof-masses 170a and 170b move anti-phase in the X-direction. The guided mass system 901 rotates out-of-plane about a first roll-sense axis. The guided mass system 902 rotates out-of-plane about a second roll-sense axis parallel to the first roll-sense axis. The guided mass system 903 rotates out-of-plane about a third roll-sense axis parallel to the first and second roll-sense axes.

The first coupling spring 302a is connected to roll proof-masses 200b and 200c. The coupling spring 302a is stiff in the X-direction such that roll proof-mass 200b and 200c move together in the X-direction. The second coupling spring 302b is connected to roll proof-masses 200a and 200d. The coupling spring 302b is stiff in the X-direction such that roll proof-mass 200a and 200d move together in the X-direction. In this way the guided mass systems 901, 902, and 903 are driven together at a drive frequency by a single drive circuit coupled to the actuators 109a-b. During the drive motion, drive masses 130a-b are vibrated anti-phase in the Y direction with the electrostatic force applied by the actuators 109a-b. Motion of the drive masses 130a-b transferred to the guiding arms 104a and 104b through the coupling springs 131a and 131b, and the guiding arms 104a-b rotate in-plane around an axis that is parallel to the Z direction. As a result of the in-plane rotation of guiding arms 104a and 104b, the roll proof-mass pair 200b and 200c and roll proof-mass pair 200a and 200d translate anti-phase in-plane in the X-direction which is detected by the drive-sense combs 106a, 106b, 106c, and 106d.

Moreover, during the drive motion, the guided mass systems 901, 902 and 903 are arranged so that when the roll proof-masses 102a-d all move in the X-direction, the pitch proof-mass 210 rotates about an axis in the Z-direction, and the yaw proof-masses 170a and 170b move anti-phase in the X-direction.

The coupling spring 302a is torsionally compliant about an axis in the X-direction so that the guided mass systems 901 and 902 can rotate out-of-plane about the first and second roll-sense axes anti-phase. The coupling spring 302a prevents the symmetric guided mass systems 901 and 902 from rotating out-of-plane in-phase.

The coupling spring 302b is also torsionally compliant about an axis in the X-direction so that the guided mass systems 902 and 903 can rotate out-of-plane about the second and third roll-sense axes anti-phase. The coupling spring 302b prevents the symmetric guided mass systems 902 and 903 from rotating out-of-plane in-phase.

Angular velocity about the pitch-input axis will cause Coriolis forces to act on the pitch proof-mass 210 resulting in a torque that rotates the pitch proof-mass 210 about the pitch-sense axis. The amplitude of the rotation of the pitch proof-mass 210 is proportional to the angular velocity about the pitch-input axis. Transducers 211a and 211b are disposed on opposite sides along the X-direction under the pitch proof-mass 210 and detect the rotation of the pitch proof-mass about the pitch-sense axis. The rotation provides a measure of the angular velocity about the pitch-input axis.

Angular velocity about the roll-input axis will cause Coriolis forces to act on the roll proof-masses 200b and 200c in a Z-direction and on roll proof-masses 200a and 200d in the opposite Z-direction. The Coriolis forces cause the guided mass systems 901, 902, and 903 to rotate out-of-plane about the first, second, and third roll-sense axis respectively. Transducer 201a under the roll proof masses 200b and 102c and transducer 201a under the roll proof masses 200a and 200d are used to detect the rotation of the guided mass systems 901,902 and 903. This rotation provides a measure of the angular velocity about the roll-input axis.

Angular velocity about the yaw-input axis will cause Coriolis forces to act on the yaw proof-masses 170a and 170b resulting in motion of the yaw proof-masses 170a and 170b anti-phase along the Y-direction. The amplitude of the motion of the yaw proof-masses along the Y-direction is proportional to the angular velocity. Transducers 522a and 522b are used to sense the motion of the respective yaw proof masses 170a and 170b along the Y-direction.

CONCLUSION

In all of the above embodiments of the gyroscope, the drive mass is separated from the rotating proof mass and the electrostatic actuators are attached to the drive mass. In so doing, the effect of the non-idealities of the electrostatic actuator on the rotating proof mass is minimized thereby enhancing the overall sensitivity of the gyroscope.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. An angular rate sensor comprising:
   a substrate;
   first and second shear masses coupled to the substrate, the first and second shear masses flexibly coupled to each other;
   a rotating structure coupled to the substrate;
   a drive mass coupled to the substrate;
   a flexible element coupling the drive mass and the rotating structure;
   an actuator coupled to the rotating structure via the drive mass for driving the rotating structure into rotational oscillation around a first axis normal to the substrate, the actuator driving the drive mass moving in a direction parallel to the substrate in a first direction and driving the first and second shear masses in anti-phase in a second direction, wherein the second direction is not parallel to the first direction;
   a first transducer responsive to the rotational oscillation of the rotating structure during a drive mode; and
   a second transducer which is responsive to angular velocity of the angular rate sensor.

2. The angular rate sensor of claim 1, wherein the first transducer is coupled to the rotating structure.

3. The angular rate sensor of claim 1, wherein the rotating structure comprises at least one of a rectangular proof mass or a circular proof mass.

4. The angular rate sensor of claim 1, wherein the drive mass is configured to be driven in a translational mode.

5. The angular rate sensor of claim 1, wherein an amplitude of the rotating structure is dependent upon the drive mass motion and the coupling element stiffness.

6. The angular rate sensor of claim 5, wherein the drive mass and the rotating structure form a mechanical system of two degrees of freedom.

7. The angular rate sensor of claim 1, wherein at least one first proof mass is flexibly coupled to the rotating structure and the at least one first proof mass responds to a Coriolis force.

8. The angular rate sensor of claim 1, wherein the rotating structure responds to a Coriolis force.

9. The angular rate sensor of claim 1, wherein the rotating structure is flexibly coupled to an at least one first translational mass and wherein the first translational mass is flexibly coupled to the substrate and is configured to translate along a second axis that is parallel to the substrate.

10. The angular rate sensor of claim 9, wherein the first transducer is coupled to the first translational mass.

11. The angular rate sensor of claim 9, wherein the angular rate sensor comprises a second translational mass, wherein the second translational mass is flexibly coupled to the substrate and is configured to translate along a third axis that is parallel to the substrate and to the second axis and wherein the first translational mass and the second translational mass moves out of phase along the second axis and the third axis, respectively.

12. The angular rate sensor of claim 11, wherein the first translational mass and the and second translational masses are configured to move anti-phase in response to a Coriolis force acting in a direction that is normal to the substrate generated by an angular rate around a fourth axis that is in-plane and orthogonal to the second axis.

13. The angular rate sensor of claim 11, wherein a proof mass is flexibly connected to the first translational mass that is able to move in the same direction as the second translational mass.

14. The angular rate sensor of claim 13, wherein a second proof mass is flexibly connected to a second translational mass which is able to move in the same direction as the first translational mass.

15. The angular rate sensor of claim 13, wherein the proof masses is able to move in response to a Coriolis force acting in a direction that is parallel to the first axis generated by an angular rate around an axis that is orthogonal to the substrate.

16. The angular rate sensor of claim 9, wherein a proof mass is flexibly connected to the first translational mass via a first spring and flexibly connected to the second translational mass via a second spring and rotates around an axis orthogonal to the substrate while the drive mass is driven in a first direction.

17. The angular rate sensor of claim 16, wherein the proof mass responds to a Coriolis force generated by an angular rate around an axis parallel to the substrate and orthogonal to the first axis.

18. The angular rate sensor of claim 1, wherein motion of the drive mass is less than the motion of the rotating structure.

19. The angular rate sensor of claim 1, further comprising a suspension system coupling the drive mass to the substrate, wherein the suspension system is stiffer than the flexible element while rotating out of plane.

20. The angular rate sensor of claim 1, further comprising:
a second rotating structure coupled to the rotating structure.

21. An angular rate sensor comprising:
a substrate;
a sense system comprising:
  a rotating structure coupled to the substrate;
  a first transducer responsive to the rotational oscillation of the rotating structure during a drive mode; and
  a second transducer which is responsive to angular velocity of the angular rate sensor; and
a drive system comprising:
  a drive mass coupled to the substrate; and
  an actuator coupled to the drive mass, the actuator driving the drive mass moving in a direction parallel to the substrate in a first direction; and
  a flexible element coupling the drive system to the sense system, wherein the actuator in the drive system is coupled to the rotating structure in the sense system for driving the rotating structure into rotational oscillation around a first axis normal to the substrate.

22. The angular rate sensor of claim 21, wherein the first transducer is coupled to a shear mass.

23. The angular rate sensor of claim 21, wherein a first translational mass is flexibly coupled to the substrate and translates along a second axis that is parallel to the substrate.

24. The angular rate sensor of claim 23, wherein a first proof mass is flexibly connected to the first translational mass via a first spring and flexibly connected to a second translational mass via a second spring and rotates around an axis orthogonal to the substrate while the drive mass is driven in a first direction.

25. The angular rate sensor of claim 24, wherein a second proof mass is flexibly connected to the first translational mass that is able to move in the same direction as the second translational mass.

* * * * *